US006915286B2

(12) United States Patent
Policastro et al.

(10) Patent No.: US 6,915,286 B2
(45) Date of Patent: Jul. 5, 2005

(54) SYSTEM AND METHOD FOR AN EDUCATION DECISION SUPPORT LIBRARY

(75) Inventors: Gary Willman Policastro, Oaklon, VA (US); Edward Patrick Tyler, Spotsylvania, VA (US)

(73) Assignee: Fairfax County School Board, Fairfax, VA (US)

( * ) Notice: Subject to any disclaimer, the term of this patent is extended or adjusted under 35 U.S.C. 154(b) by 274 days.

(21) Appl. No.: 09/898,266

(22) Filed: Jul. 3, 2001

(65) Prior Publication Data

US 2003/0018605 A1 Jan. 23, 2003

(51) Int. Cl.⁷ .................................... G06F 17/30
(52) U.S. Cl. .................. 707/1; 707/10; 709/217; 434/354
(58) Field of Search .................. 707/1–10, 100–104.1, 707/200–206; 709/217, 203–205; 434/322–360; 706/45–50

(56) References Cited

U.S. PATENT DOCUMENTS

| | | | |
|---|---|---|---|
| 5,173,051 A | 12/1992 | May et al. | 434/118 |
| 5,310,349 A | 5/1994 | Daniels et al. | 434/350 |
| 5,864,869 A | 1/1999 | Doak et al. | 707/104.1 |
| 6,014,670 A * | 1/2000 | Zamanian et al. | 707/101 |
| 6,149,441 A | 11/2000 | Pellegrino et al. | 434/350 |
| 6,315,572 B1 | 11/2001 | Owens et al. | 434/322 |
| 6,339,775 B1 * | 1/2002 | Zamanian et al. | 707/101 |
| 6,341,960 B1 | 1/2002 | Frasson et al. | 434/322 |
| 6,347,333 B2 | 2/2002 | Eisendrath et al. | 709/217 |
| 6,496,822 B2 * | 12/2002 | Rosenfelt et al. | 707/9 |
| 6,533,583 B1 | 3/2003 | Sportelli | 434/118 |
| 6,622,003 B1 * | 9/2003 | Denious et al. | 434/350 |
| 6,651,071 B1 * | 11/2003 | O'Brien et al. | 707/102 |

OTHER PUBLICATIONS

Barqin, Ramon & Paller, Alan. "10 Data Warehouse Mistakes to Avoid." *Application Development Trends*, Jul. 1995, 6 pages.
Kimball, Ralph. "Casual (Not Casual) Dimensions." *DBMS*, Nov. 1996, 3 pages.
Kimball, Ralph. "Data Warehouse Role Models." *DBMS Magazine*, Aug. 1997, 3 pages.
Kimball, Ralph. "Drilling Down, Up, and Across." *DBMS*, Mar. 1996, 4 pages.
Kimball, Ralph. "Help for Dimensional Modeling." *DBMS Magazine*, Aug. 1998, 6 pages.
Kimball, Ralph. "Is Data Staging Relational." *DBMS Magazine*, Apr. 1998, 4 pages.
Kimball, Ralph. "Is ER Modeling Hazardous to DSS?." *DBMS*, Oct. 1995, 3 pages.
Kimball, Ralph. "It's Time for Time." *DBMS Magazine*, Jul. 1997, 5 pages.
Kimball, Ralph. "Slowly Changing Dimensions." *DBMS*, Apr. 1996, 3 pages.
Kimball, Ralph. "Surrogate Keys." *DBMS Magazine*, May 1998, 4 pages.
Madsen, Mark. "Warehouse Design in the Aggregate." *Database Programming & Design*, Jul. 1996, 7 pages.

(Continued)

*Primary Examiner*—Shahid Alam
*Assistant Examiner*—Jean Bolte Fleurantin
(74) *Attorney, Agent, or Firm*—Hunton & Williams

(57) ABSTRACT

The present invention discloses a method and system for providing an education decision support library to enable user access to information, over a processor based network. The information assists the user in making an administrative decision. The method includes the steps of loading operational data from one or more sources into a database; providing one or more analytical tools that enable a user to manipulate the operational data; and accessing the one or more analytical tools over the processor based network to assist in an educational environment.

53 Claims, 15 Drawing Sheets

OTHER PUBLICATIONS

Moriarty, Terry. "Modeling Data Warehouses." *Database Programming & Design*, Aug. 1995, 5 pages.

Pletch, Andrew. "Three Questions for Database Design." *Database Programming & Design*, Sep. 1989, 17 pages.

* cited by examiner

| | | | | |
|---|---|---|---|---|
| 50850760137102289FAUGHNAN | BILLY | AF101990524SLNC3 0172287 | 194103 | |
| 50850764137102289FAUGHNAN | BILLY | AF101990524SLNC3 0051289 | 194103 | |
| 50850766137102289FAUGHNAN | BILLY | AF101990524SLNC3 0173329 | 194103 | |
| 50850765137102289FAUGHNAN | BILLY | AF101990524SLNC3 0031316 | 194103 | |
| 24240777151062488HOLDEN | CRISSLER | NF101990524SLNC3 0172311 | 206003 | |
| 24240773151062488HOLDEN | CRISSLER | NF101990524SLNC3 0051206 | 206003 | |
| 24240778151062488HOLDEN | CRISSLER | NF101990524SLNC3 0173308 | 206003 | |
| 50890783033102888MICHAEL | MARY | DM101990524SLNC3 0172394 | 163103 | |
| 50890786033102888MICHAEL | MARY | DM101990524SLNC3 0051366 | 163103 | |
| 50890787033102888MICHAEL | MARY | DM101990524SLNC3 0173412 | 163103 | |
| 50890782033102888MICHAEL | MARY | DM101990524SLNC3 0031421 | 163103 | |
| 24240783125110588LIVELY | FREDDREICA | CM101990524SLNC3 0172355 | 206003 | |
| 24240784125110588LIVELY | FREDDREICA | CM101990524SLNC3 0051366 | 206003 | |
| 24240785125110588LIVELY | FREDDREICA | CM101990524SLNC3 0173383 | 206003 | |
| 24240782725110588LIVELY | FREDDREICA | CM101990524SLNC3 0031450 | 206003 | |
| 33050783843011089MARSHALL | LESLIE | GF101990524SLNC3 0172323 | 220303 | |
| 33050783443011089MARSHALL | LESLIE | GF101990524SLNC3 0051306 | 220303 | |
| 33050783543011089MARSHALL | LESLIE | GF101990524SLNC3 0173344 | 220303 | |
| 33050783643011089MARSHALL | LESLIE | GF101990524SLNC3 0031316 | 220303 | |
| 24330790704061989STANGLER | JOSEPH | JH101990524SLNC3 0172360 | 220503 | |
| 24330790804061989STANGLER | JOSEPH | JH101990524SLNC3 0051338 | 220503 | |
| 24330790804061989STANGLER | JOSEPH | JH101990524SLNC3 0173441 | 220503 | |
| 24330790304061989STANGLER | JOSEPH | JH101990524SLNC3 0031389 | 220503 | |
| 50850796551120489CARROLL | JIM | GM101990524SLNC3 0172366 | 194103 | |
| 50850796651120489CARROLL | JIM | GM101990524SLNC3 0051325 | 194103 | |
| 50850796751120489CARROLL | JIM | GM101990524SLNC3 0173400 | 194103 | |
| 50850796351120489CARROLL | JIM | GM101990524SLNC3 0031404 | 194103 | |
| 21060797513072589SHALLANT | VINCE | JH101990524SLNC3 0172421 | 071003 | |
| 21060797713072589SHALLANT | VINCE | JH101990524SLNC3 0051410 | 071003 | |
| 21060797413072589SHALLANT | VINCE | JH101990524SLNC3 0173400 | 071003 | |

| Name | Type | Null? |
|---|---|---|
| SCHOOL_ID | VARCHAR2(4) | |
| STUDENT_ID | VARCHAR2(10) | |
| BIRTH_DATE_INPUT | VARCHAR2(6) | |
| STUDENT_LAST_NAME | VARCHAR2(60) | |
| STUDENT_FIRST_NAME | VARCHAR2(60) | |
| STUDENT_MIDDLE_INITIAL | VARCHAR2(1) | |
| GENDER_CODE | VARCHAR2(4) | |
| ETHNICITY_CODE | VARCHAR2(4) | |
| PRIMARY_LANGUAGE_CODE | VARCHAR2(4) | |
| TEST_DATE | VARCHAR2(6) | |
| TEST_ID | VARCHAR2(8) | |
| TEST_PART_ID | VARCHAR2(4) | |
| SCALE_SCORE_1 | NUMBER(3) | |
| SCALE_SCORE_2 | NUMBER(3) | |
| SCALE_SCORE_3 | NUMBER(3) | |
| SCALE_SCORE_4 | NUMBER(3) | |
| VDOE_SCHOOL_ID | VARCHAR2(4) | |
| GRADE_LEVEL_CODE | VARCHAR2(4) | |
| SOL_STUDENT_INPUT_KEY | | NOT NULL NUMBER |

Figure 6

| Name | Type | Null? |
|---|---|---|
| SOL_STUDENT_SCORE_KEY | | NOT NULL NUMBER |
| CLUSTER_KEY | NUMBER | |
| SCHOOL_YEARS_KEY | NUMBER | |
| STUDENTS_KEY | NUMBER | |
| REGISTRATIONS_KEY | NUMBER | |
| STUDENTS_REPORTING_KEY | | NOT NULL NUMBER |
| SCHOOLS_KEY | NUMBER | |
| LANGUAGES_KEY | | NOT NULL NUMBER |
| ATTENDING_PYRAMIDS_KEY | NUMBER | |
| POPULATIONS_KEY | | NOT NULL NUMBER |
| GEO_SCHOOL_PYRAMIDS_KEY | NUMBER | |
| SOCIO_ECONOMICS_KEY | | NOT NULL NUMBER |
| SCHOOLS_REPORTING_KEY | | NOT NULL NUMBER |
| HOME_LOCATIONS_KEY | | NOT NULL NUMBER |
| VDOE_REGIONS_KEY | | NOT NULL NUMBER |
| GRADE_LEVELS_KEY | | NOT NULL NUMBER |
| SCHOOL_PYRAMIDS_KEY | | NOT NULL NUMBER |
| GEOGRAPHIC_AREAS_KEY | | NOT NULL NUMBER |
| REPORTING_AREAS_KEY | | NOT NULL NUMBER |
| TEST_ADMINISTRATIONS_KEY | | NOT NULL NUMBER |
| STANDARDIZED_TESTS_KEY | | NOT NULL NUMBER |
| AUDIT_TRAILS_KEY | | NOT NULL NUMBER |
| TEST_SCORE_NBR | | NOT NULL NUMBER |
| ADMIN_SCHOOLS_REPORTING_KEY | | NOT NULL NUMBER |
| PROFICIENCY_LEVEL_CODE | | NOT NULL NUMBER |
| COUNT | | NOT NULL NUMBER |

Figure 7

**\*Volume Deployment (Alphabetical)**

Advanced Placement Test (AP)
Approved Instructional Materials
Elementary Academic Records
Facilities Management
Family and Early Childhood Education Program (FECEP)/Head
Financial Analysis
Grade Point Average (GPA)
Graduation Information
High Schools: Course Enrollment and Marks
Human Resources
Human Resources (Staffing)
Instructional Management Systems
International Baccalaureate Test (IB)
Logistics
Math/Science Completers
Middle Schools: Course Enrollment and marks
Otis-Lennon School Ability Test
Professional Technical Studies Completers
Resource Teachers
SAT Test Results
School wide Achievement Index
Service Program Enrollment
Special Education
Standardized Tests
Start Report/Child Plus Database
Student Discipline
Student Membership
Summer School
Test: Standards of Learning (SOL)
Tests: Stanford 9
Virginia Literacy Passport Test (VLT)
\*Additional Volumes to be identified as operational data becomes available

Fig. 10

SYSTEM AND METHOD FOR AN EDUCATION DECISION SUPPORT LIBRARY

FIELD OF THE INVENTION

The invention relates generally to a system and method for providing an education decision support library that enable individuals working in or associated with a learning environment to access and analyze data relevant to the delivery of instruction and related student services. Specifically, the invention defines an information technology solution that integrates methods and tools to transform operational school and student data into an information resource customized for facilitating decisions that impact school administration, curriculum, and/or individual student learning.

BACKGROUND OF THE INVENTION

School system administrators, principals, counselors, faculty members and support staff make decisions that influence the learning environment either at a system-wide, local school, or at an individual student level. In making such decisions, administrators, faculty and staff must often overcome obstacles related to either a lack of sufficient data or, conversely, the need to organize an overwhelming quantity of data. The inability to access the right data at the right time or to acquire reliable, consistent and accurate data also thwarts the efforts of faculty and staff to apply data in the decision making process. For example, a school administrator with a large and diverse student population may have difficulty in determining the correlation between a number of factors, such as academic preparedness, student mobility, course enrollment, and student test scores on standardized tests. An understanding of the relationships between these factors may influence staffing decisions, funding for a local school program, and/or result in changes to a student's academic plans.

In addition to the data issues described, faculty and staff must also contend with the lack of adequate user-friendly tools to access, organize, and analyze data. Educational institutions collect vast quantities of student demographic and performance data. However, the format of this data is often ill suited for the average administrator, faculty or staff member who lacks the sophisticated technical skills and/or time to gather and prepare the data for analysis. Thus, administrators, faculty and staff must either make decisions with insufficient or incomplete data or must delay decision making while computer specialists, statisticians, or other staff members compile the required data.

The current decision support methods for education is a labor-intensive effort with respect to data gathering and preparation. As a result, existing processes can not respond rapidly in today's dynamic environment characterized by growth in student diversity; increased student mobility; higher expectations from families, politicians, and industry; competition from alternative educational providers; shortened life-cycle for instructional technology; new research in learning methods; limited funding resources; impact of social issues such as violence and substance abuse; and accelerated expansion of humanity's knowledge in all fields of study. In such an environment, the decision support methods of yesteryear are obsolete for today's educators.

A majority of current student information systems address only operational needs, such as processing transactions related to the activities that occur during the school day or satisfying static record keeping mandates. These systems provide insufficient methods to support data analysis for educational decision-making. The invention resolves this deficiency.

SUMMARY OF THE INVENTION

Hereinafter, features and advantages in accordance with embodiments of the system and method of the present invention will be described. The description will be provided in the context of an administrator, faculty, or staff member of an elementary school, secondary school, special education center or special program center of a local public school district. However, the invention is not limited to such environments. For example, other educational institutions such as a private school, a state education agency, a post-secondary education institution, or a professional development entity may employ the invention.

In the course of delivering instructional and related services in an educational institution, an administrator or educator makes a number of decisions that may impact a single student, a small number of students, or the entire student population of the institution. In order to make such decisions, the individual requires access to data that are timely, accurate, relevant and of sufficient granularity with respect to the issue.

For example, an administrator may need to make a decision regarding the remediation of a group of students or regarding strategies to improve a program's effectiveness. A number of factors must be considered and analyzed in order to develop the optimal solutions to pursue. Data associated with student attendance, student academic readiness, student mobility, standardized test results, faculty professional development, instructional resource availability, and technology support may all be involved in the analysis.

One embodiment of the present invention provides the administrator with computer network access to a database containing such data. Using a commercially available browser, the administrator connects to the intranet site that serves as a portal to the decision support library. The library contains the student and school based data that is relevant to the forthcoming analysis. Furthermore, the library offers the administrator software tools to facilitate data analysis. For example, after defining the student population in question, the administrator requests a comparison of the students' results from a number of standardized tests with the students' attendance records and with the students' membership data over the past couple of school years. The software tool responds to the request by gathering and loading the data into a multidimensional structure that is suited for such comparison analysis. Once loaded, the administrator begins manipulating the data to quantitative results.

As the administrator discovers new relationships or facts in the data, the tool enables the administrator to expand his or her analysis. By supporting greater complexity in analysis, the probability that the administrator will gain new or increased insight into the students' performance increases. For example, in an effort to understand student performance in similar and in different instructional settings, the administrator may wish to include additional factors, such as disciplinary actions, into the analysis. If the data is available in the education decision support library, then the tool easily locates the data and expands the multidimensional structure with the new requested data.

The example illustrating an administrator's application of an embodiment of this invention highlights one of the primary features of this invention. Specifically, the invention defines a recursive method for preparing and transforming operational data into a decision support resource for educators. In one embodiment, the system and method of the invention provides a technique for capturing data and rules; loading data from a variety of sources; filtering the data; and scrubbing (validating) the data in order to remove anomalies. Once the data has been scrubbed, the process of the invention transforms the data according to pre-defined rules. The transformed data are held in a staging area where dimensional indices are assigned to facilitate data retrieval and analysis. Finally, the indexed data are migrated into the education decision support library database and, if appropriate, into specialized multidimensional data structures. Having created this decision support data resource, the system and method of the invention further delivers tools that enable users to perform a variety of on-line analytical processes and activities such as report generation, longitudinal analysis, forecasting and data sharing.

BRIEF DESCRIPTION OF THE DRAWINGS

In order to provide a complete understanding of the present invention, reference is now made to the appended figures. These figures should not be construed as limiting the present invention, but are intended to be exemplary only, wherein:

FIG. 2 is an example of source data according to one embodiment of the system and method of the invention;

FIG. 6 shows an example of a table used to process and store the data according to one embodiment of the system and method of the invention;

FIG. 7 is an example of the fact tables used to process and store the data according to one embodiment of the system and method of the invention;

FIG. 10 is an example of operational data or a data mart according to one embodiment of the system and method of the invention;

DETAILED DESCRIPTION OF THE PREFERRED EMBODIMENTS

The present invention will now be described in more detail with reference to exemplary embodiments thereof as shown in the appended drawings. While the present invention is described below with reference to exemplary embodiments, it should be understood that the present invention is not limited thereto. Those of ordinary skill in the art will recognize additional implementations, modifications, and embodiments, as well as other fields of use, which are within the scope of the present invention as disclosed and claimed herein, and with respect to which the present invention could be of significant utility.

Figure 1:
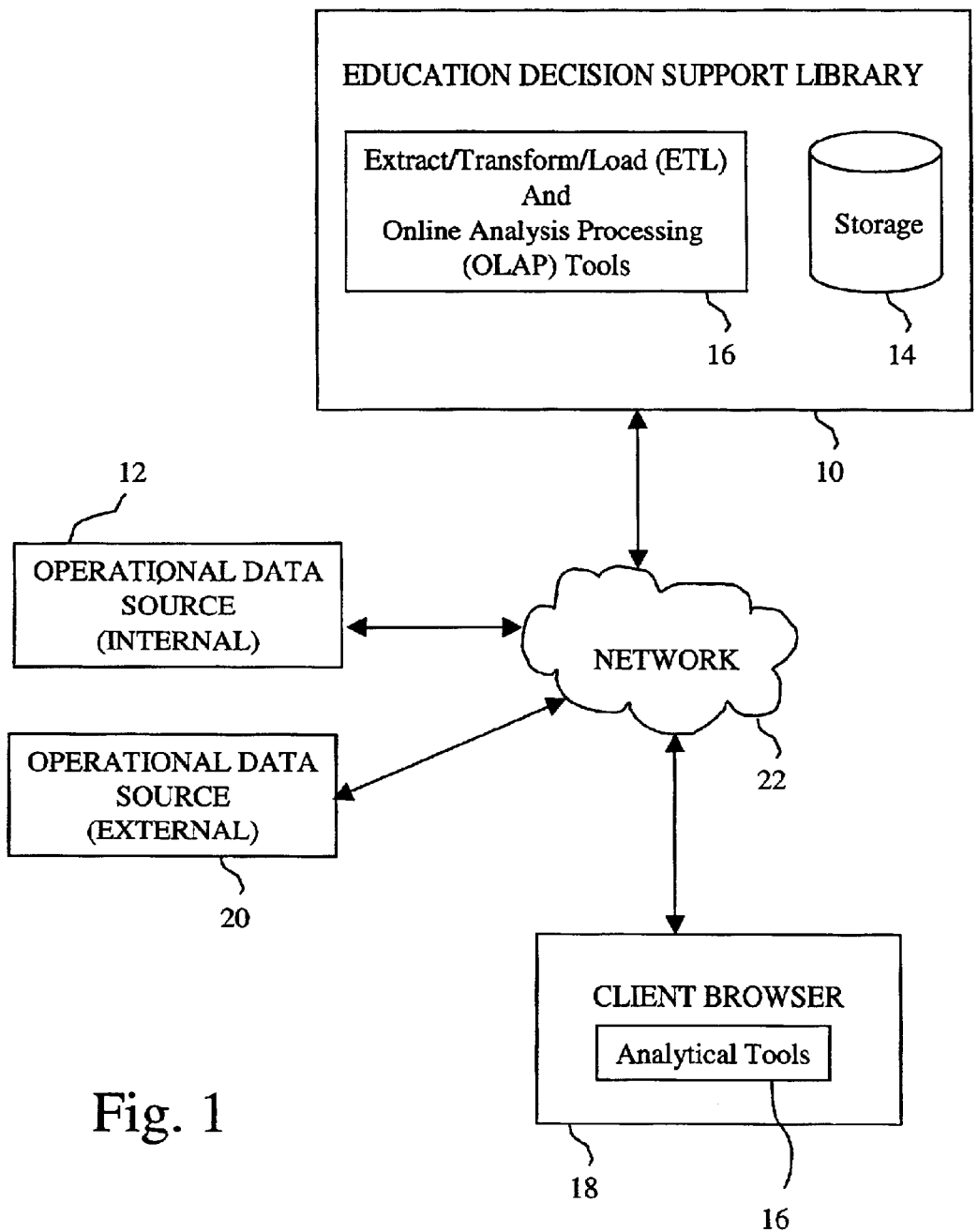
FIG. 1 is a schematic of the overall system according to one embodiment of the system and method of the invention.

FIG. 1 is a graphic representation of the overall system according to one embodiment of the system and method of the invention. As indicated earlier, a wide array of individuals having different roles in an educational institution may use the invention. A school system administrator who manages faculty and support staff is one example of a user of the invention. As a user of the invention, the individual may also employ an "agent". An "agent" is an executable object of limited artificial intelligence that performs work in accordance with the instructions and rules embedded within its pre-defined script. Thus, agents may access and employ the system and methods of the invention in order to gather and deliver specific data. For example, an agent may deliver only the latest student results for a particular standardized test whenever a particular event occurs.

In addition to earning acceptance by the user community, the success of the invention also depends on the alacrity and expertise of the data stewards. A "data steward" serves as the custodian of a set of data that are related to a particular subject domain, such as student membership, standardized tests, and special education programs. As the data custodian, the data steward possesses expert "business" knowledge of the domain. Typically, the data steward has the legal accountability and responsibility for the accuracy, completeness, and security of the data.

Figure 14:
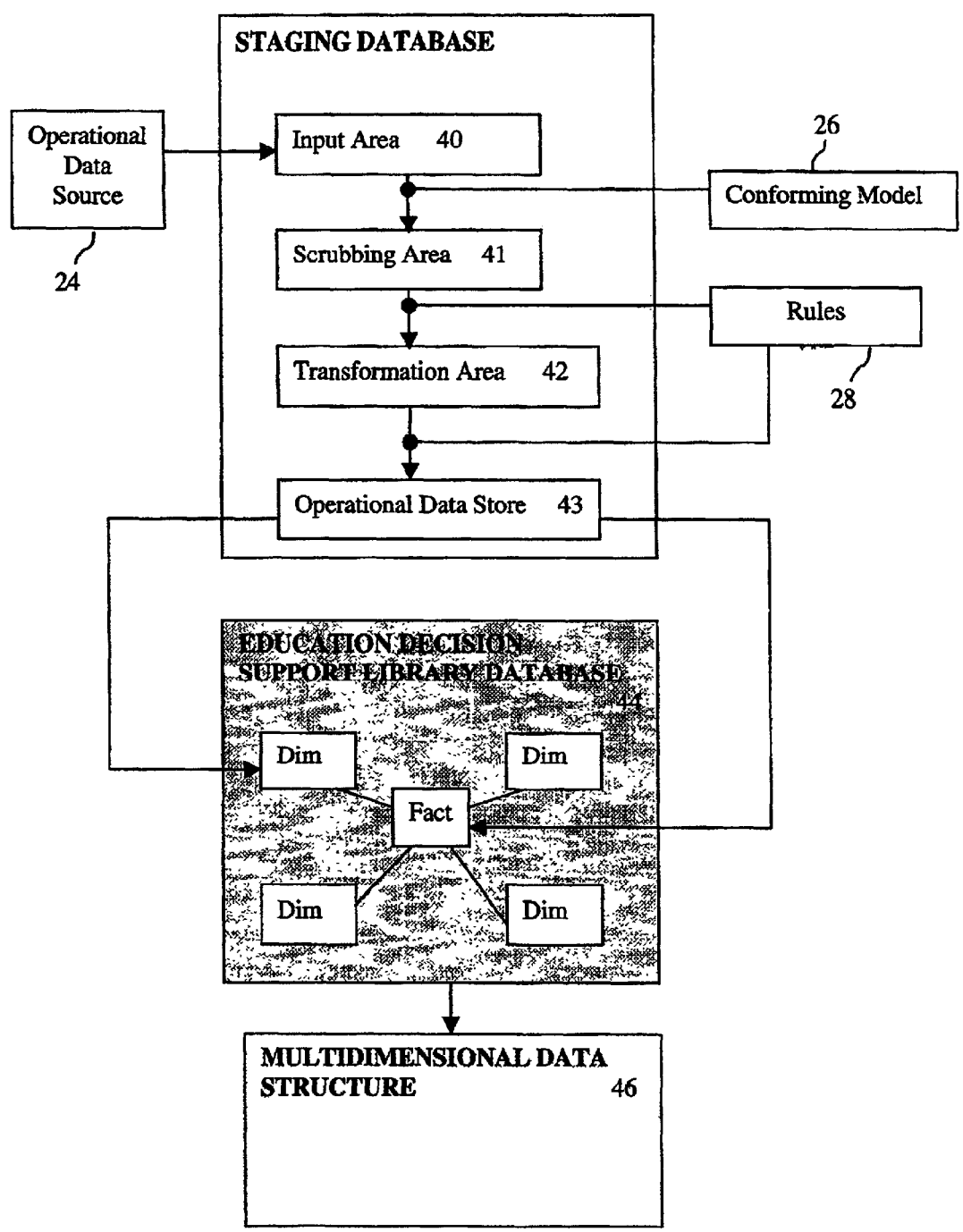
FIG. 14 is a diagram that depicts the movement of data from the operational data source to its availability as a decision support resource according to one embodiment of the system and method of the invention.

In accordance with one embodiment of the method and system of the invention, FIG. 14 shows, in summary, the movement of data from an operational data source 24 to its availability as a decision support resource. The operational data is loaded into an input area 40 of the staging database. Using a "conforming model" 26, the input data 40 is first cleansed in order to remove operational data peculiarities, such as process control flags, that are irrelevant from a decision support and/or data analysis context. After removing the irrelevant data elements, the cleansed data is loaded into the scrubbing area 41 of the staging database. The data in area 41 is scrubbed in order to identify and remove errors and other anomalies in accordance with predefined rules 28. The scrubbed data is loaded into the transformation area 42 of the staging database. During the transformation process, the area 42 data is reformatted and altered in accordance with the rules 28 in order to enhance its consistency and usability as a decision support resource. The transformed data is loaded into the operational data store area 43 of the staging database. The resulting data in area 43 is a denormalized data structure that also includes the dimensional keys of the education decision support library (EDSL) database 44. The data in area 43 can be used to satisfy specific point-in-time types of reports. However, the primary purpose of area 43 is to provide data that has been cleansed, scrubbed, and transformed for loading into the education decision support library database 44. The data architecture of the EDSL database 44 is a star schema that consists of a set of fact tables surrounded by a set of reusable dimension tables. If enhanced access performance and/or complex analysis, such as longitudinal analysis involving large quantities of data across multiple dimensions, are required, then the EDSL data is loaded into a multidimensional data structure 46. Data stored in a multidimensional data structure 46 has a specific architecture or organization that enhances its suitability for use with sophisticated online analysis processing (OLAP) tools.

Returning to FIG. 1, the focal point of the overall system is the education decision support library 10 that is accessible over a network 22 through the use of a browser or browsers 18. The education decision support library 10 may comprise of a centrally located, processor based system or may be distributed across multiple servers. The decision support library may also have network links to one or more data sources 12, 20. The network links may be achieved as a local area network (LAN), a wide area network (WAN), a wireless network, the Internet, or a combination, for example.

In some embodiments, the data sources may be classified as either an internal data source 12 or as an external data source 20. FIG. 2 provides an example of one such data source prior to its preparation and transformation into a decision support resource. The primary observation regarding data sources 12 and 20 is that both may comprise of a system that captures and retains data that supports a particular purpose. Thus, data sources 12 and 20 may contain either transactional data, reference data (e.g. normalized test scores or U.S. census data) or data that has already been transformed into a decision support resource (e.g. a financial data mart).

As depicted in FIG. 1, the decision support library may employ commercially available software 16 such as ETL (extraction-transformation-load) tools, user analytical tools and data modeling tools; data storage systems; and network communication devices. ETL tools include any suitable software that enables users to extract, format and store data. For example, ETL tools may include such commercially available products as Informatica PowerMart Designer™ and Oracle PL/SQL™. Analytical and data modeling tools include software that facilitates data access, computation, and/or publication. Examples of such tools include Crystal Decisions Holos™ and Crystal Reports™; Oracle Discoverer™, Viewer™ and Designer 2000™; Computer Associates ERwin™; Java; and Strafford Technology Infogateway Portal™. In some embodiments, these software tools may be distributed over multiple servers and accessible over the network. Access, in some embodiments, is achieved through client browsers 18, such as Microsoft Internet Explorer™ and Netscape Navigator™.

With respect to data storage 14 in FIG. 1, some embodiments may utilize multiple data repositories. For example, one repository may serve to support the process of transforming the operational data while another repository may contain the final products of the transformation process. Thus, storage 14 may be any suitable system and device for storing data electronically. One example of such a commercially available storage system is the Oracle Enterprise Server™.

The analytic tools 16 may enable any number of data processing functions. For example, analytic tools 16 may enable creation of relationship links between individual data points, cleaning of data, updating of data, normalization of data, formatting of data, mathematical processing of data, graphing, longitudinal analysis, restructuring data, and comparison of different data, along with other functions.

In some embodiments, the analytic tools 16 may be distributed over several processor-based devices, such as via the Internet and/or an intranet. Client/browser side processor based devices, such as the client/browser 18 processor device, for example, may include some, or all, of the analytic tools 16.

As noted above, some embodiments of the education decision support library 10 may communicate with one or more operational data sources 12, 20. For example, operational data source 12 and operational data source 20 may communicate with the education decision support library 10. While two operational data sources 12, 20 are indicated in FIG. 1, any number of sources is possible. In some embodiments, operational data sources 12, 20 may comprise an interconnected network, such as a local area network (LAN), a wide area network (WAN), a wireless network, the Internet, or other type of network, for example.

Communication between the operational data sources 12, 20 and the education decision support library 10 may be accomplished in any suitable fashion. For example, communication may be over dedicated network connections (e.g., LAN, WAN, etc.), over telephone lines (e.g., via modem), over a wireless network, over the Internet, or by manual loading, such as by using a via floppy disk.

In some embodiments, operational data sources 12, 20 may include any suitable data source that provides data that may assist an administrator, or other user, when making a decision. For example, operational data sources 12, 20 may comprise a system for storing, retrieving, and managing large amounts of any type of data. Operational data sources 12, 20 may also comprise data marts and external data sources not inherent to an enterprise, for example.

Data marts are subsets of the education decision support library that focus on a specific subject or knowledge domain and that may exist independently as a separate data resource. A data mart may contain individual data or aggregated/summarized data. Data marts may also be mobile (e.g., downloaded onto a mobile laptop or other mobile device capable of storing the data). Data marts may also comprise historical data (e.g., membership), financial data (e.g., operational costs, salaries, and overhead, for example), human resources data (e.g., teacher certification, staffing, etc.), School Administration Student Information Cross Platform (SASIXP) databases (e.g., student grades, attendance records, etc.), external benchmark sources (e.g., local, state, or national standard providers), or other sources of information. An example of data from an operation data source 12 is depicted in FIG. 2.

Further, the data mart may be a repository that is internal or owned by the institution, which is operating the EDSL. Alternatively, the data mart may be a repository that is external or not owned by the institution and to which the institution has access. Further, the data mart may be a "mobile data mart" which may be characterized as a repository that resides on a personal computing device and that is created, maintained and/or accessed via mobile computing technologies.

Of course, the type of operational data source 12, 20 may vary with the nature of the organization for which decisions are made (e.g., educational, enterprise level, government, etc.), the type of decision to be made (e.g., financial, legal, student achievement, organizational, etc.), as well as with a variety of other factors.

In some embodiments, the education decision support library 10 may also communicate with a network 22. As noted above, the network 22 may comprise any suitable processor based network. For example, network 22 may comprise a LAN, WAN, wireless network, the Internet, an intranet, or other suitable network.

In some embodiments, network 22 enables education decision support library 10 to, among other things, communicate with client-side processor devices (e.g., via HTML, JAVA designed interface, Web browser, etc.). For example, education decision support library 10 may communicate with client/browser 18 via network 22. In some embodiments, such as shown in FIG. 1, operational data sources 12, 20 may also communicate with education decision support library 10 and client/browser 18 via network 22 (e.g., using a browser interface and software such as Oracle Discoverer™).

As used herein, client/browser 18 may comprise any suitable processor device capable of communicating with education decision support library 10. For example, the client/browser 18 may comprise a workstation, a personal computer (PC), a laptop computer, a palm top computer (e.g., personal digital assistant (PDA)), browser, an Internet compatible cell phone or television, or other processor-based device.

In some embodiments, the client/browser 18 may comprise a processor device that is accessible by an administrator of an organization. For example, the client/browser 18 may comprise a terminal that is accessible by a school system administrator, school board member, principal, teacher, employee, manager, government official, an assistant or agent of any of the above, or other administrator. Administrators, or their agents, may use the client/browser 18 to access education decision support library 10. As noted above, administrator access to education decision support library 10 may be via network 22.

Figure 3:
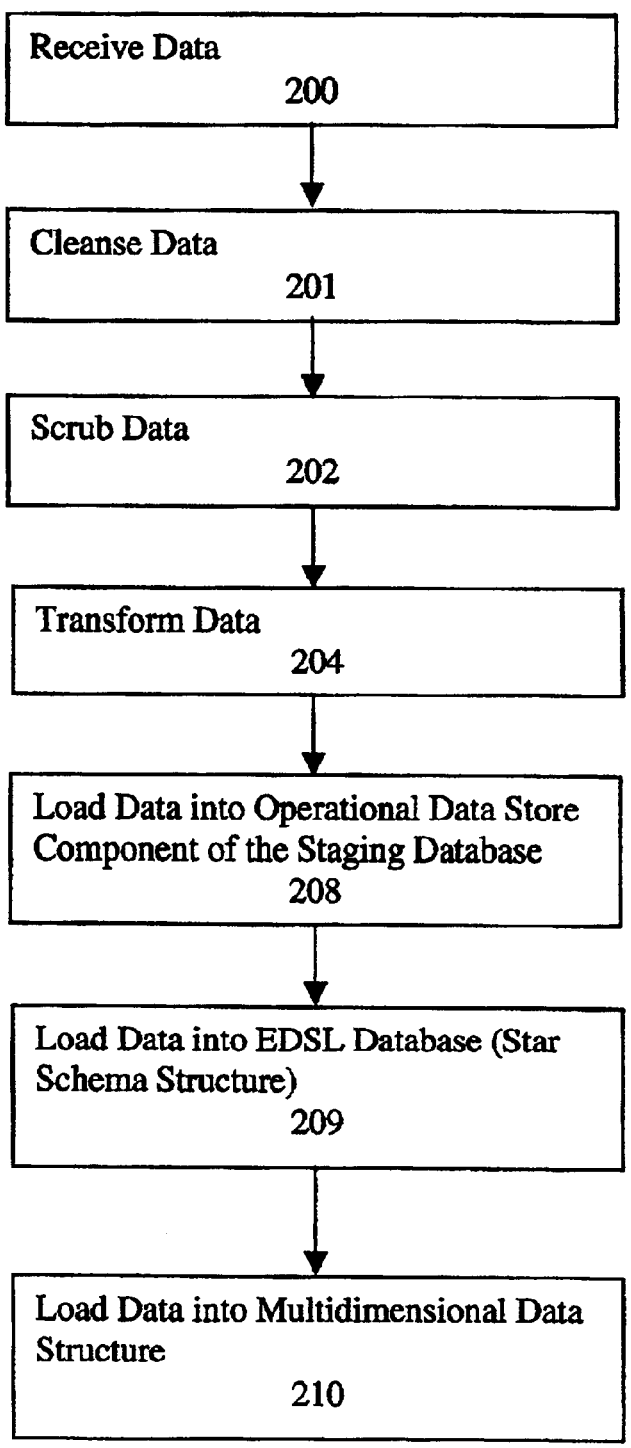
FIG. 3 depicts the data flow that results in the transformation of operational data according to one of the embodiments of the system and method of the invention.

FIG. 3 describes, in greater detail, the flow of data according to one embodiment of the system and method of the invention. The data transformation process commences at step 200 with a transfer and receipt of data from the data source and into the staging database of the education decision support library. Data transfer may occur in any suitable manner. For example, data may be periodically uploaded via the network; copied from a disk or tape; or manually entered. Furthermore, step 200 may be evoked as a response to a business event, such as the end of the grading period; according to a regular schedule (e.g. weekly, monthly, or yearly); or, by demand.

Using a "conforming model", the data received is cleansed in step 201 in order to remove operational data peculiarities, such as process control flags, that are irrelevant from a decision support and/or data analysis context. After removing the irrelevant data elements, the cleansed data is ready for scrubbing in step 202.

The scrubbing step 202 may be used to filter, modify, edit, update, and validate the cleansed data. In some embodiments of the invention, scrubbing 202 may also convert outdated file formats (e.g. historical data from legacy systems) to more usable formats.

Figure 4:
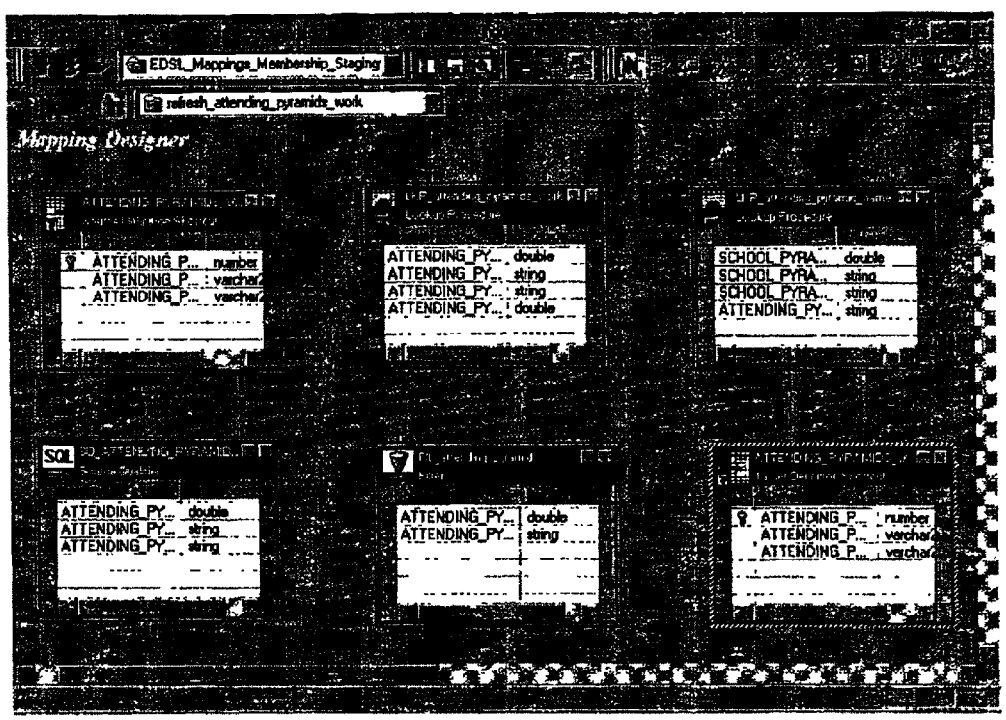
FIG. 4 shows an example of the transformation process used to process the data according to one embodiment of the system and method of the invention.

The scrubbed data may be transformed at step 204. Transformation may comprise of any suitable routines that convert data into a format and organization that are suitable for data analysis and decision support. Furthermore, in some embodiments, step 204 may include the establishment of relationships between operational data points that assist in validating or changing data. For example, reference table relationships and pointers may be assigned to the data points in order to facilitate data manipulation, sorting, referential integrity enforcement, and data correlation. FIG. 4 provides a sample of the transformation process when an individual uses an ETL tool such as Informatica PowerMart Designer™.

Figure 5:
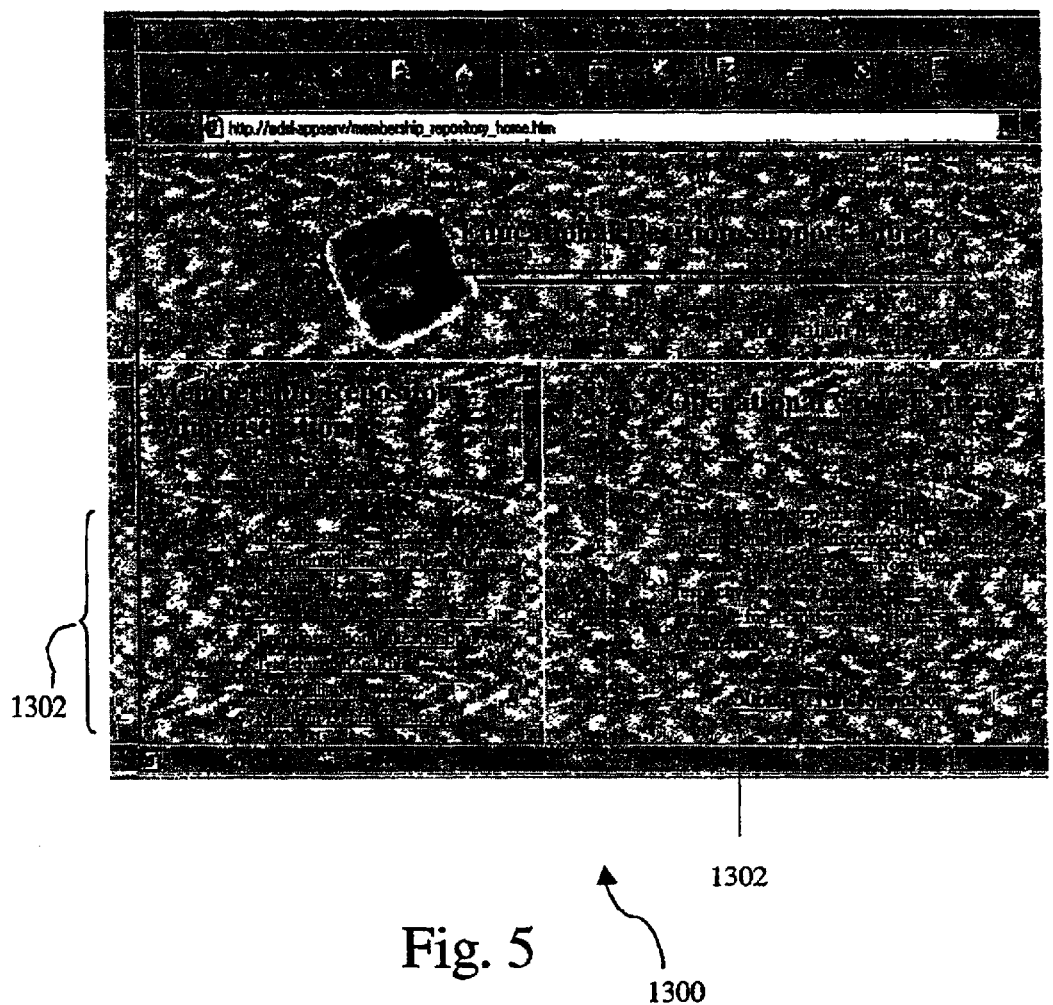
FIG. 5 is an example of a user editing interface according to one embodiment of the system and method of the invention.

FIG. 5 shows one embodiment of a data steward interface 1300. A data steward interface 1300 may be provided to enable data steward access to operational data. The data steward interface 1300 may comprise links 1302, or other process initiators, that enable a data steward, or other administrator to transform operational data. The data steward interfaces with the transformed data in order to edit, validate, and approve the operational data. Additionally the data steward interface allows the data steward to change the format of the raw data and set business rules to ensure that the information is correct. For example if a student is 18 years old, the source record indicates that the student is in the 9th grade when the student should actually be in the 12th grade. At this point the data steward would correct the record.

FIG. 6 and FIG. 7 are tables that display samples of what the data structure may look like after it has been through the transformation process, in accordance with one embodiment of the method and system of the invention. The examples shown in FIG. 6 and FIG. 7 show the name of the data field, the type of data that the table will contain, and if data is required to be entered into a field before the record will be excepted into the table.

Returning to FIG. 3, once the data has been transformed, the data may be loaded to the operational data store component of the staging database in step 208. The staging database may comprise of any suitable storage system that stores data. In some embodiments, the staging database may be located on the same server as the education decision support library or may be located on a different server. The operational data store may store the transformed data in domain, fact, or dimension tables. Domain tables may contain code values used in operational systems, code values used only within the decision support library, and textual description for each code values stored. Fact and dimension tables reflect the star schema that has been defined for the education decision support library.

Accordingly, after step 208, the process may pass to step 209. In step 209, the data is loaded into the education decision support library (EDSL) database. The EDSL database is based on a star schema architecture.

At step 210, the data may be loaded into a multidimensional data structure if the user requirements and analytical tool demand such a structure. For example, data may be presented as a cube with data relating to student ethnicity along one face, data relating to student membership along another face, and school years along the remaining face. By re-arranging the faces of the cube, the user may view the data from different perspectives.

Figure 8:
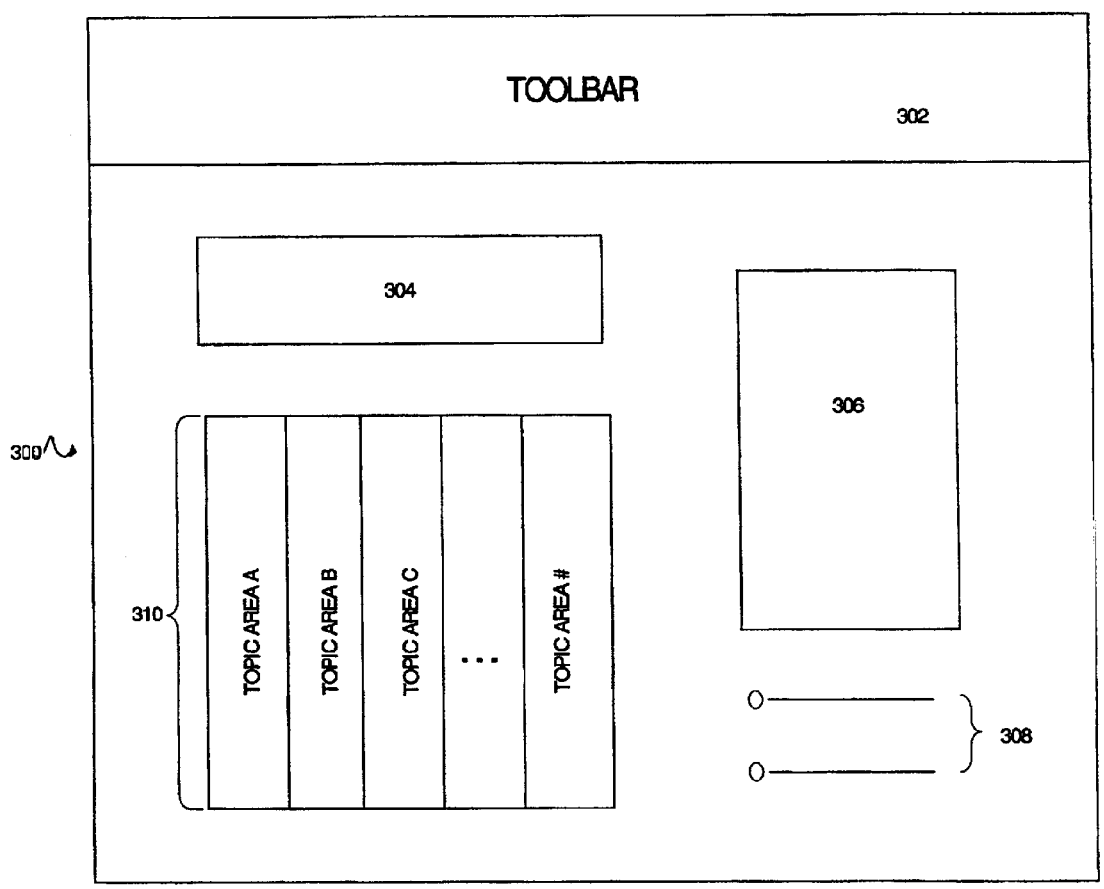
FIG. 8 is a schematic of a user interface according to one embodiment of the system and method of the invention.
Figure 9:
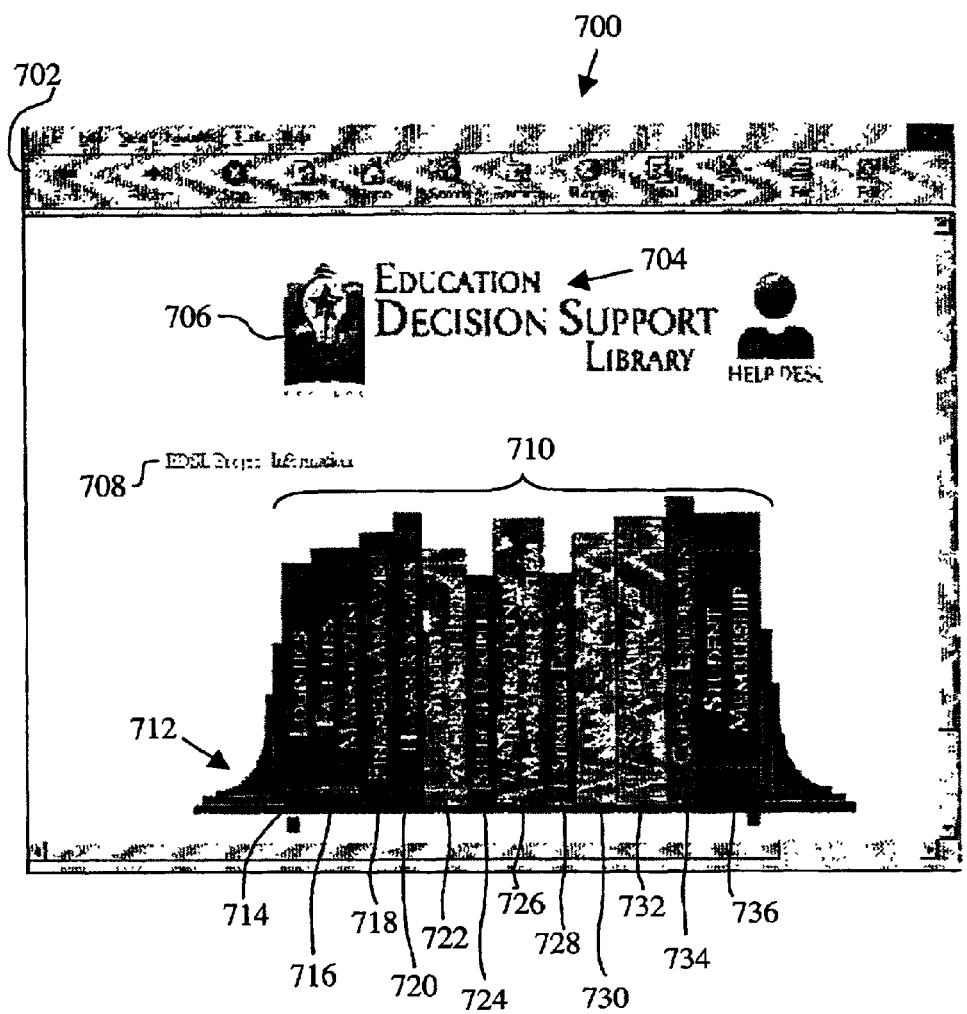
FIG. 9 is a representation of a user interface according to one embodiment of the system and method of the invention.

In some embodiments, a user interface may be provided to facilitate access to the educational support library over a network. FIG. 8 is a schematic of one possible user interface that utilizes a commercially available browser. FIG. 9 provides another embodiment of a user interface. In this example, the subject areas available in the education decision support library are depicted as individual volumes of a book series. The use of subject areas to group related data assists the user in locating specific data sets within the education decision support library. FIG. 10 contains a sample of the possible subject areas.

In some embodiments, a user interface may comprise typical browser features. For example, as shown in FIG. 8, toolbar 302, banner 304, graphics 306, text links 308, and other items may be included as part of the user interface. As shown, the interface 700 may comprise tool bar 702, banner 704, graphics 706, text links 708, and other features.

For example, FIG. 9 shows one embodiment of an interface 700 having links 710 to one or more administrative topics. In this embodiment, links 710 to a multidimensional data structure for predetermined categories of data are designed to resemble book volumes on a shelf 712. The volumes may include logistics 714, facilities management 716, financial analysis 718, human resources 720, student achievement index 722, student discipline 724, instructional management systems 726, strategic targets 728, student grades 730, standardized tests 732, course enrollment 734, and student membership 736, for example.

Figure 11:
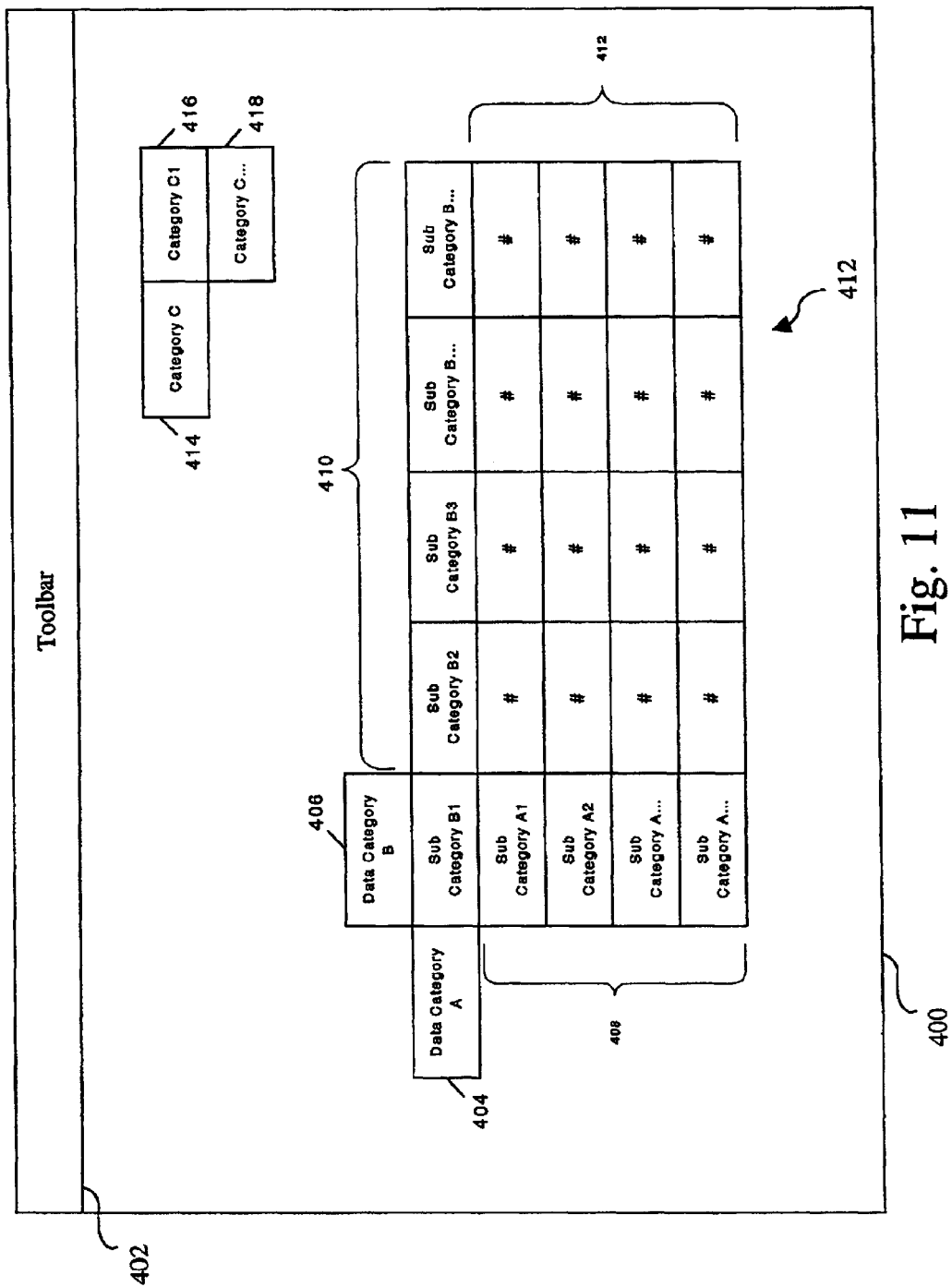
FIG. 11 is a schematic representation of a multidimensional data structure according to one embodiment of the system and method of the invention.

As mentioned above, one feature of the invention is to provide administrators, or agents, with a multidimensioned data structure to enable the administrator or agent to analyze the data. FIG. 11 is a schematic representation of a multi-dimensional data structure according to one embodiment of the invention. As indicated, a multidimensional data structure 400 may be presented using appropriate software (e.g., Crystal Decisions, Inc. Holos™).

Figure 12:
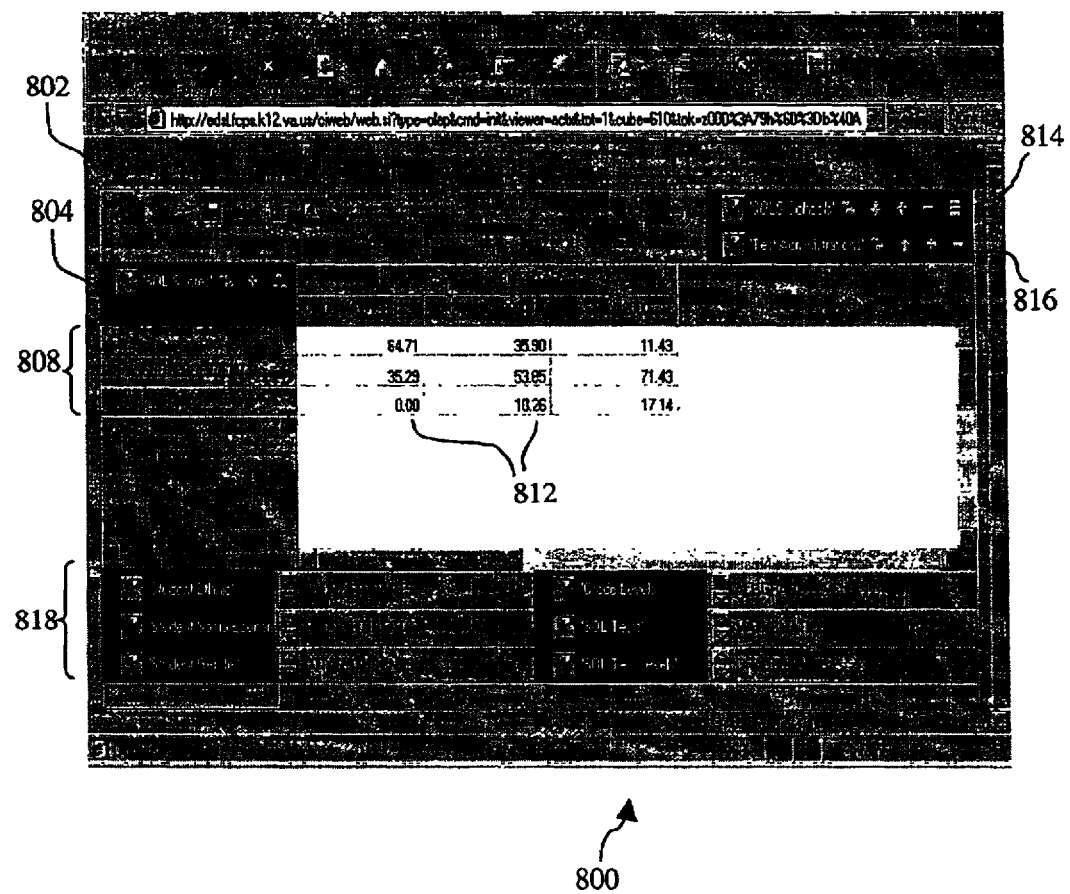
FIG. 12 is an illustrative user interface showing a multidimensional data structure according to the one embodiment of the system and method of the invention.

The multidimensional data structure may be presented in an appropriate interface. In some embodiments, the interface may comprise a toolbar 402 or other functional controls. For example, in some embodiments, data categories may be represented as graphic tiles or emblems (e.g., 404, 406, 408, 414, 416, 418). FIG. 12 shows one embodiment of a multidimensioned data structure 800 comprising a toolbar 802 and operational data categories represented by graphic tiles 804, 806, 808, 814, 816, and 818.

In some embodiments, the user may arrange the tiles or emblems to create multidimensioned charts or worksheet for analysis. For example, FIG. 11 shows one example of a two dimensional chart showing a relationship between data category A (item 404) and data category B (item 406). FIG. 12 shows one example of a two dimensional chart demonstrating a relationship between Standards of Learning (SOL) test scores 804 and Pine Spring elementary school 806.

Figure 13:
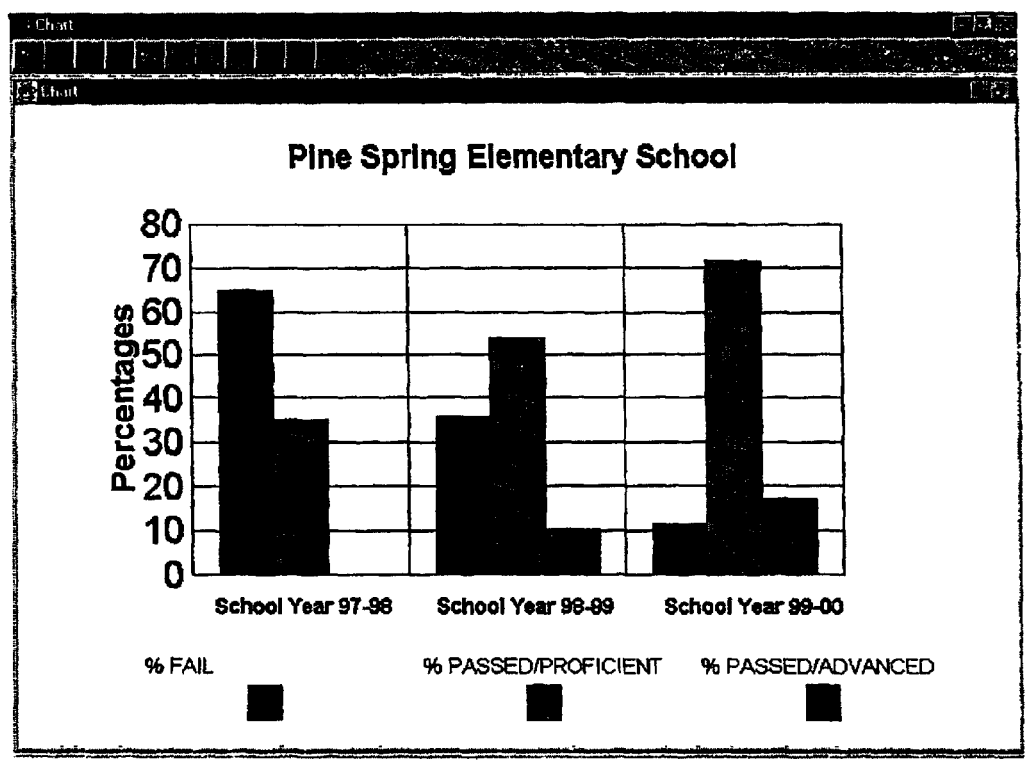
FIG. 13 is a schematic representation of a multidimensional data structure that has been manipulated to display a graphical representation of the data according to one embodiment of the system and method of the invention.

In some embodiments, each category may comprise one or more subcategories (e.g., subcategories $A_1, \ldots, A_n$ (item 408) and subcategories $B_1, \ldots, B_n$ (item 410). The relationships between category A and category B, and the associated subcategories, may be displayed in display field 412. For example, FIG. 12 shows subcategories of test results 808 (e.g., percent failed, percent passed/proficient, and percent passed/advanced) and subcategories of test dates 812 (e.g., 6 May 1998, 24 May 1999, and 31 May 2000). Other methods of presenting relationships between categories are possible. For example, spreadsheets, worksheets, charts, graphs, and other techniques may be used to display relationships between categories. FIG. 13 is one example of a graph generated using data in multidimensional data structure 800.

Figure 15:
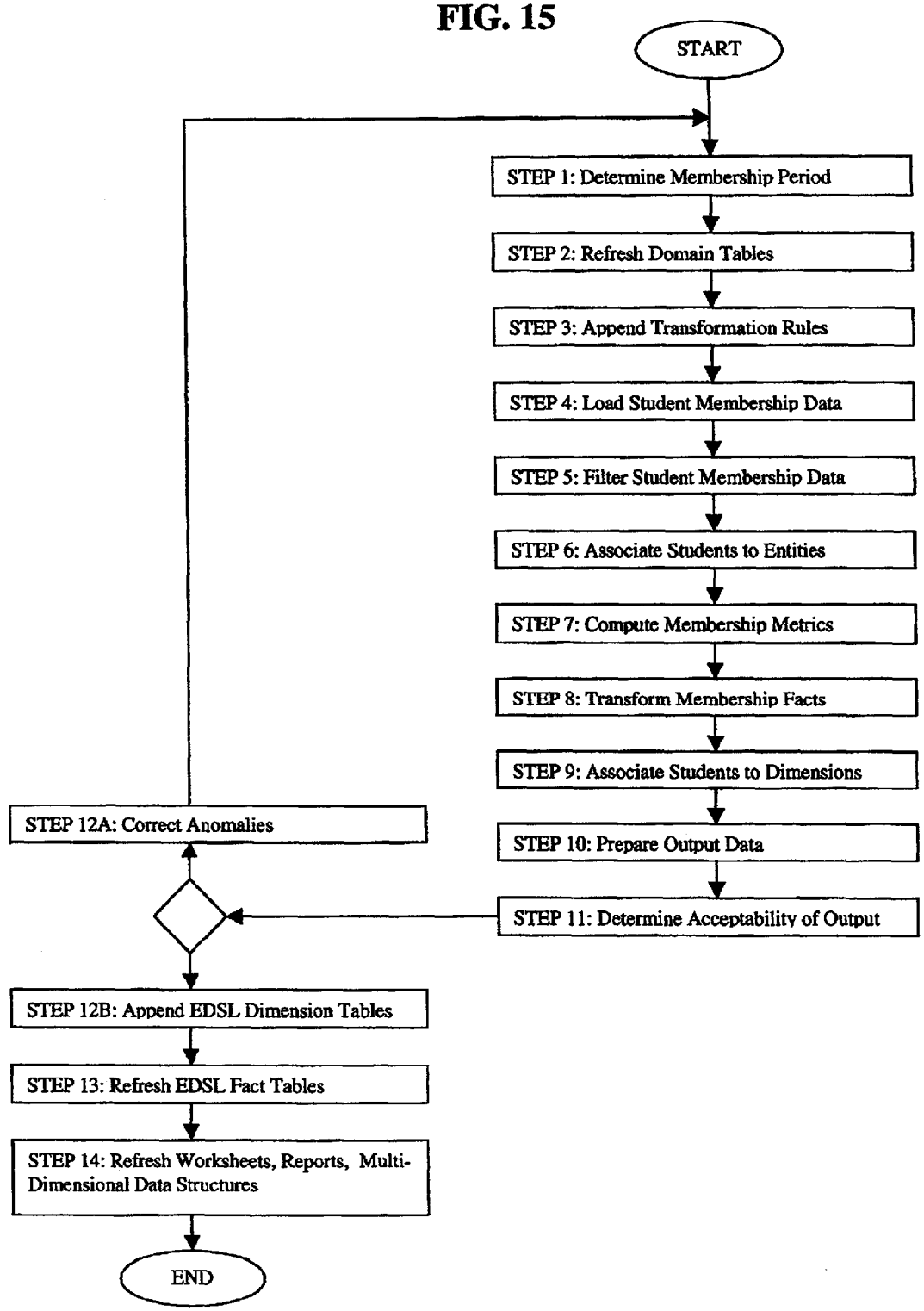
FIG. 15 describes the overall workflow according to one embodiment of the method and system of the invention.

FIG. 15 offers an example of one embodiment of the method and system of the invention. Specifically, FIG. 15 depicts a process of transforming student membership data from an operational data source into a decision support resource for use and storage within EDSL. To complete the transformation process, a series of fourteen sequential steps is performed in accordance with this embodiment of the methods and systems of the invention. Each step must be successfully completed before proceeding to the next step. The following table summarizes the objectives of each step.

TABLE 1

| STEP | OBJECTIVES |
|---|---|
| 1 | Receive from the data steward the membership period to be processed.<br>Validate membership period by applying the data quality filters (rules).<br>If the input conforms to all the rules, accept the membership period.<br>If the input fails to conform to a rule, reject the membership period. |
| 2 | For each attribute that is significant to the student membership area and that relies on a reference resource (e.g. planning units, schools, pyramids, years), refresh the reference:<br>Load operational values from data source into an input domain table.<br>Validate each entry in the input domain table by applying the data quality filters (rules).<br>If an entry conforms to all the rules, load the entry into the appropriate domain table.<br>If an entry fails to conform to a rule, reject the entry by loading the rejected entry into the appropriate anomaly data table.<br>Require the data steward for the specified domain to resolve all anomalous entries. |
| 3 | For each attribute that is significant to the student membership area and that is represented as a domain (set) of codes, synchronize the operational code values and decision support code values:<br>Insert new operational code values from data source into the operational domain table.<br>Insert new decision support code values from the data steward into the decision support domain table.<br>Permit data steward to modify and/or remove decision support code descriptions.<br>Require the data steward to review all newly inserted operational code values.<br>Require the data steward to specify the transformation rule for the conversion of each operational code value into a decision support code value and description.<br>Retain the transformation rule in the decision support domain table. |
| 4 | Load student membership data for the membership period indicated from data source into an input data table. |
| 5 | Validate each student membership entry in the input data table by applying the data quality filters (rules).<br>If an entry conforms to all the rules, load the entry into the filtered data table.<br>If an entry fails to conform to a rule, reject the entry by loading the rejected entry into the anomaly data table. |
| 6 | For each student membership entry in the filtered data table:<br>Assign the student to a facilities planning block per business rules.<br>Assign the student to a facilities planning unit per business rules.<br>Assign the student to a postal ZIP code per business rules.<br>Determine the student's base school per business rules.<br>Determine the student's school name per business rules.<br>Determine the student's school's state agency classification per business rules.<br>Determine the student's pyramid per business rules. |
| 7 | For each unique student identifier in the filtered data table:<br>Retrieve the student membership facts from EDSL.<br>Load the membership facts into the metric table.<br>For each student membership entry in the filtered data table:<br>Compute a series of membership metrics (e.g. school year-to-date days present, school year-to-date days absent, total years of membership in school) per specified algorithms.<br>Insert the computed metrics into the filtered data table. |
| 8 | Load all entries in the filtered data table into the transformed data table.<br>For each student membership entry in the transformed data table:<br>For specified attributes, replace the operational code values with the decision support code value per the transformation rules in the decision support domain table.<br>If a transformation fails due to the absence of an equivalent decision support code value, reject the entry by loading the rejected entry into the anomaly data table. |
| 9 | For each student membership entry in the transformed data table and for each specified EDSL dimension: |

TABLE 1-continued

| STEP | OBJECTIVES |
|---|---|
|  | Determine the dimension to which the entry should be assigned per business rules.<br>If an existing dimension exists, assign the dimension key to the entry.<br>If an existing dimension does not exist, insert a new dimension into the appropriate dimension work table and assign the key of the new dimension to the student membership entry. |
| 10 | For each student membership entry in the transformed data table:<br>Determine if the entry qualifies as a new fact for EDSL.<br>If the entry is a new fact, create an entry in the membership output table. |
| 11 | Require the data steward to review the quality of each entry in the membership output table.<br>Require the data steward to review each entry in the anomaly data table.<br>Subsequent to the processing of step 11, the process can go to 12A and/or 12B, since both step 12A and 12B can be done simultaneously. |
| 12A | Require the data steward to resolve all anomalies.<br>At the data steward's discretion, return to step 1 and repeat process. |
| 12B | At the data steward's discretion, refresh the EDSL dimension tables with the entries in the corresponding dimension work table in accordance with the specified business rules. |
| 13 | Refresh the EDSL student membership fact table with the entries in the membership output table in accordance with the specified business rules. |
| 14 | Load EDSL membership fact table and dimension tables into a multidimensional data structure<br>Publish new worksheets and reports |

As illustrated in FIG. 15 and in Table 1 above, the depicted embodiment utilizes the method and system of the invention as described in FIGS. 1, 3, and 14 to extract, transform, and load operational student membership data into EDSL. This particular embodiment relies on the diligence and alacrity, i.e., speed, of the data stewards to ensure quality of the data stored within EDSL and on the accuracy, currency and completeness of the stewards' data filter rules, transformation rules, and business rules. To facilitate the data stewards' tasks, a staging database is employed. The staging database contains reference data tables and domain tables that store the valid set of operational code and decision support code values. The domain tables also contain the data transformation rules. Furthermore, the staging database contains various work tables, tables of data anomalies, and output tables for refreshing the EDSL repositories. EDSL repositories, in this particular embodiment, are comprised of a relational database and a series of multidimensional data structures.

Embodiments of the system of the invention as shown above are in the form of a computer or computer system. As used herein, the term "computer" or "computer system" is to be understood to include at least one processor utilizing a memory or memories. The memory stores of the system of the invention retain at least portions of an executable program code at one time or another during operation of the processor portion of the computer. Additionally, the processor executes various instructions included in that executable program code. An executable program code is a set of instructions in machine language that executes in a particular computer system environment to perform a particular task. The executable program code processes data in response to commands by a user. As used herein, it will be appreciated that the term "executable program code" and the term "software" mean substantially the same thing for the purposes of the description as used herein.

It is to be appreciated that to practice the system and method of the invention, it is not necessary that the various processors and/or the memories used in the practice of the invention be physically located in the same place. That is, it should be appreciated that each of the processors and the memories may be located in geographically distinct locations and connected so as to communicate in any suitable manner, such as over a network or the Internet, for example. Additionally, it should be appreciated that each of the processors and/or the memories may be composed of the same or different physical pieces of equipment. Accordingly, it is not necessary that the processor be one single piece of equipment in one location and that the memory be another single piece of equipment in another location. That is, it is contemplated that the a particular processor may be two pieces of equipment in two different physical locations. The two distinct pieces of equipment may be connected in any suitable manner. Additionally, a particular memory used in the invention may include two or more portions of memory in two or more physical locations. Further, the memory could include or utilize memory stores from the Internet, Intranet, Extranet, LAN, satellite interface or some other source or over some other network, as may be necessary or desired.

As described above, the method of the invention may illustratively be embodied in the form of a computer or computer operating system. It is to be appreciated that the software or programs that enable the computer operating system to perform the operations described above may be supplied on any of a wide variety of data holding media. Further, it should be appreciated that the implementation and operation of the system and method of the invention may be in the form of computer code written in any suitable programming language or languages, which provide instructions to the computer by which the computer may manipulate data.

It should be appreciated that the software code or programming language that is utilized in a computer system to perform the above described invention may be provided in any of a wide variety of forms. Illustratively, the software may be provided in the form of machine language, assembly code, target language, object code, source code or source language, as well as in other forms. Further, the software may be in the form of compressed or encrypted data utilizing a suitable compression or encryption algorithm.

Additionally, it should be appreciated that the particular medium utilized to hold either the software used in conjunction with the invention or the data, which is manipulated by the software, may take on any of a variety of physical forms. Illustratively, the medium may be in the form of a compact disk, a DVD, an integrated circuit, a hard disk, a floppy diskette, a magnetic tape, a RAM, a ROM, or a remote transmission, as well as any other medium or source of information that may be read by a computer or other operating system.

Accordingly, the software of the method of the invention may be provided in the form of a hard disk or be transmitted in some form using a direct telephone connection, the Internet, an Intranet, or a satellite transmission, for example. Further, the programming language enabling the system and method of the invention as described above may be utilized on all of the foregoing and any other medium by which software or executable program code may be communicated to and utilized by a computer or other operating system.

As described herein, the system and method of the invention may utilize an application program, a collection of separate application programs, a module or modules of a program, or a portion of a module of a program, for example.

As noted above, it should be appreciated that the computer language used in the system and method of the invention may be any of a wide variety of programming languages. Further, as is also noted above, it is not necessary that a single programming language be utilized in conjunction with the operation of the system and method of the invention. Rather, any number of different programming languages may be utilized as is necessary or desirable.

As described above, in the system and method of the invention, a variety of user interfaces are utilized. A user interface may be in the form of a dialogue screen for example. As used herein, a user interface includes any software, hardware or combination of hardware and software used in an operating system that allows a user, or other person, to interact with the operating system. A user interface may include any of a touch screen, keyboard, mouse, voice recognition device, dialogue screen, menu box, a list, a checkbox, a toggle switch, a pushbutton or any other object that allows a user to receive information regarding the operation of the program and/or provide the operating system with information. Accordingly, a user interface used in conjunction with the system and method of the invention may be any device or collection of devices that provides communication between a user and a computer. The information provided by the user to the computer through the user interface may be in the form of a command, a selection or data, or other input, for example.

A user interface is utilized by an operating system running an application program to process data for a user. As should be appreciated, a user interface is typically used by a computer for interacting with a user either to convey information or receive information. However, it should be appreciated that in accordance with the system and method of the invention, it is not necessary that a human user actually interact with a user interface. Rather, it is contemplated that the user interface of the invention may interact, i.e., convey and receive information, with another operating system or computer, rather than a human user. Further, it is contemplated that the user interfaces utilized in the system and method of the invention may interact partially with another operating system while also interacting partially with a human user.

It should be appreciated that although the system and method of the present invention has been described herein in the context of particular implementations in particular environments for particular purposes, those of ordinary skill in the art will recognize that the usefulness of the system and method of the invention is not limited thereto and that the present invention can be beneficially implemented in any number of environments for any number of purposes.

It will be readily understood by those persons skilled in the art that the present invention is susceptible to broad utility and application. Many embodiments and adaptations of the system and method of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made merely for the purposes of providing a full and enabling disclosure of the invention. The foregoing disclosure is not intended to be construed or to limit the present invention or otherwise to exclude any other such embodiments, adaptations, variations, modifications and equivalent arrangements, the present invention being limited by the claims and the equivalents thereof.

What is claimed is:

1. A method for providing an education decision support library in an educational environment to enable user access to information, over a processor based network, wherein the information assists the user in making a decision in the educational environment, the method comprising the steps of:

loading operational data from one or more sources into a database;

providing one or more tools to extract and transform data into a decision support resource;

providing one or more analytical tools that enable a user to manipulate the data; and accessing the one or more analytical tools over the processor based network; and further including scrubbing the operational data, the scrubbing the operational data including:

removing operational peculiarities from the operational data; and validating the operational data.

2. The method of claim 1, wherein the step of loading operational data from one or more sources further includes loading data from at least one of a data mart and legacy system.

3. The method of claim 2, wherein the data mart is a mobile data mart.

4. The method of claim 2, wherein the data mart is an internal repository, which is internal to an entity providing the education decision support library.

5. The method of claim 2, wherein the data mart is an external repository, which is external to an entity providing the education decision support library.

6. The method of claim 1, wherein the step of loading operational data from one or more sources further includes loading data from a human resources department.

7. The method of claim 1, wherein the step of loading operational data from one or more sources further includes loading data from a financial department.

8. The method of claim 1, wherein the step of loading operational data from one or more sources further includes loading historical data, the historical data from a historical file.

9. The method of claim 1, wherein the step of loading operational data from one or more sources further includes loading data from a student information database.

10. The method of claim 1, wherein the step of loading operational data from one or more sources further includes loading data corresponding to an external benchmark.

11. The method of claim 1, wherein the removing operational peculiarities from the operational data includes at least one of editing, updating, and deleting data with operational peculiarities.

12. The method of claim 1, further including scrubbing the operational data by applying the data to a conforming model.

13. The method of claim 1, further including organizing the loaded operational data into one or more tables, entity objects, data objects or relational objects.

14. The method of claim 1, wherein the step of loading operational data from one or more sources further includes loading data from Test Standards of Learning (SOL).

15. The method of claim 1, wherein the step of loading operational data from one or more sources further includes loading data from a membership category.

16. The method of claim 1, wherein the step of loading operational data from one or more sources further includes loading data from a high school course enrollment and Marks category.

17. The method of claim 1, wherein the step of loading operational data from one or more further includes loading data from a middle school course enrollment and Marks category.

18. The method of claim 1, wherein the step of loading operational data from one or more sources further includes loading data from a special education category.

19. The method of claim 1, wherein the step of loading operational data from one or more sources further includes loading data from a service program enrollment category.

20. The method of claim 1, wherein the step of loading operational data from one or more sources further includes loading data from a Stanford 9 test category.

21. The method of claim 1, wherein the step of loading operational data from one or more sources further includes loading data from a school wide achievement index category.

22. The method of claim 1, wherein the step of loading operational data from one or more sources further includes loading data from a human resources category.

23. The method of claim 1, wherein the step of loading operational data from one or more sources further includes loading data from an advanced placement (AP) test category.

24. The method of claim 1, wherein the step of loading operational data from one or more sources further includes loading data from at least one selected from the group consisting of a Graduation Information category, an International Baccalaureate Test (IB) category, a Scholastic Achievement Test (SAT) category, an Approved Instructional Materials category, an Elementary Academic Records category, a Facilities Management category, a Family and Early Childhood Education Program (FECEP)/Head Start Report/Child Plus Database, a Grade Point Average (GPA) category, and a Staffing category.

25. The method of claim 1, wherein the step of loading operational data from one or more sources further includes loading data from at least one selected from the group consisting of an instructional management systems category; a logistics category; a math/science completers category; an Otis-Lennon School Ability Test category; a professional Technical Studies Completers category; a Resource Teachers category; and a Standardized Tests category.

26. The method of claim 1, wherein the step of loading operational data from one or more sources further includes loading data from at least one of a Student Discipline category and a Summer School category.

27. The method of claim 1, wherein the step of loading operational data from one or more sources further includes loading data from a Virginia Literacy Passport Test (VLPT) category.

28. The method of claim 1, wherein the providing one or more analytical tools that enable a user to manipulate the data allow the user to manipulate the data so as to assist in making a decision in the educational environment.

29. A method for providing an education decision support library in an educational environment to enable user access to information, over a processor based network, wherein the information assists the user in making a decision in the educational environment, the method comprising the steps of;

loading operational data from one or more sources into a database;

providing one more tools to extract and transform data into a decision support resource;

providing one or more analytical tools that enable a user to manipulate the data; and accessing the one or more analytical tools over the processor based network; and the method further including applying a transformation to the operational data to create a staging database.

30. The method of claim 29, further including applying a business rule to the staging database to create a domain table.

31. The method of claim 29, further including applying at least one business rule to the staging database to create a multidimensional data structure.

32. The method of claim 31, further including creating a plurality of the multidimensional data structures, wherein the plurality of multidimensional data structures are organized into one or more volumes according to a predetermined category of the operational data.

33. A method for providing a decision support library to enable administrator access to information in an educational environment, over a processor based network, wherein the information assists the administrator in making an administrative decision, the method comprising the steps of:

loading operational data from one or more sources into a database;

scrubbing the operational data, the scrubbing the operational data including removing operational peculiarities from the operational data and validating the operational data;

applying a transformation to the operational data to create a staging database;

providing one or more analytical tools that enable the administrator to manipulate the operational data in the staging database; and accessing the one or more analytical tools and manipulating the operational data over the processor based network.

34. The method of claim 33, wherein the step of loading operational data from one or more sources further includes loading data from at least one of a data mart and legacy system.

35. The method of claim 33, further including applying a business rule to the staging database to create a domain table.

36. The method of claim 33, further including applying at least one business rule to the staging database to create a plurality of multidimensional data structures, the plurality of multidimensional data structures being organized into one or more volumes according to a predetermined category of the operational data.

37. The method of claim 33, further including organizing the loaded operational data into one or more tables, entity objects, data objects or relational objects.

38. A method for providing an education decision support library to enable user access to information in an educational environment, over a processor based network, wherein the information assists the user in a decision process, the method comprising the steps of:

loading operational data from at least one source into a database;

scrubbing the operational data, the scrubbing the operational data including removing operational peculiarities from the operational data and validating the operational data;

applying a transformation to the operational data to create a staging database;

providing one or more analytical tools that enable the user to manipulate the operational data in the staging database; and accessing the one or more analytical tools and manipulating the operational data.

39. The method of claim 38, wherein the step of manipulating the operational data is performed over a processor based network.

40. The method of claim 38, further including the step of applying business rules to the staging database to create a plurality of multidimensional data structures, the plurality of multidimensional data structures being organized into one or more volumes according to a predetermined category of the operational data.

41. The method of claim 40, further including arranging faces of the multidimensional data structures to display different operational data.

42. The method of claim 38, further including the steps of:

displaying operational data categories of the operational data, the operational data categories represented by tiles; and arranging the tiles to create multidimensioned charts.

43. A system for providing decision support to enable user access to information in an educational environment, the information assisting the user in making a decision, the system comprising:

an operational data source containing education related data;

a decision support portion, the decision support portion inputting operational data from the operational data source, the decision support portion scrubbing the operational data, the scrubbing the operational data including removing operational peculiarities from the operational data and validating the operational data, the decision support portion further applying a transformation to the operational data to create a staging database;

an analytical tool that enables the user to manipulate the operational data in the staging database, the user accessing the analytical tool and manipulating the operational data; and a user interface, the user interface, providing access to the analytical tool and displaying the operational data.

44. The system of claim 43, wherein the operational data source is a data mart or a legacy system.

45. The system of claim 43, wherein the decision support portion applies a business rule to the staging database to create a domain table.

46. The system of claim 43, wherein the decision support portion applies business rules to the staging database to create a plurality of multidimensional data structures, the plurality of multidimensional data structures being organized into one or more volumes according to a predetermined category of the operational data.

47. The system of claim 46, wherein the user is enabled to arrange faces of the multidimensional data structures displayed on the user interface, using the analytical tool, to display different operational data.

48. The system of claim 43, wherein the user is enabled to display operational data categories of the operational data, the operational data categories represented by tiles.

49. The system of claim 48, wherein the user is enabled to arrange the tiles using the user interface.

50. A system for providing decision support to enable user access to information in an educational environment, the information assisting the user in making a decision, the system comprising:

an operational data source containing education related data;

a decision support portion, the decision support portion inputting operational data from the operational data source, the decision support portion scrubbing the operational data, the scrubbing the operational data including removing operational peculiarities from the operational data and validating the operational data, the decision support portion further applying a transformation to the operational data to create a staging database, the decision support portion applying business rules to the staging database to create a plurality of multidimensional data structures, the plurality of multidimensional data structures being organized into one or more volumes according to a predetermined category of the operational data, wherein the user is enabled to arrange faces of the multidimensional data structures displayed on a user interface, using an analytical tool, to display different operational data;

the analytical tool enabling the user to manipulate the operational data in the staging database, the user accessing the analytical tool and manipulating the operational data; and the user interface providing access to the analytical tool and displaying the operational data.

51. A system for providing an education decision support library to enable user access to information in an educational environment, the information assisting the user in a decision process, the system comprising:

means for loading operational data from at least one source into a database;

means for scrubbing the operational data, the scrubbing the operational data including removing operational peculiarities from the operational data and validating the operational data;

means for applying a transformation to the operational data to create a staging database;

means for providing one or more analytical tools that enable the user to manipulate the operational data in the staging database; and means for accessing the one or more analytical tools and manipulating the operational data.

52. The system of claim 51, further including:

means for applying business rules to the staging database to create a plurality of multidimensional data structures, the plurality of multidimensional data structures being organized according to a predetermined category of the operational data.

53. A method for providing an education decision support library in an educational environment to enable user access to information, over a processor based network, wherein the information assists the user in making a decision in the educational environment, the method comprising the steps of:

loading operational data from one or more sources into a database;

providing one or more tools to extract and transform data into a decision support resource;

providing one or more analytical tools that enable a user to manipulate the data and make a decision in the educational environment; and accessing the one or more analytical tools over the processor based network so that the user may use the analytical tools to make a decision in the educational environment.

* * * * *

UNITED STATES PATENT AND TRADEMARK OFFICE
CERTIFICATE OF CORRECTION

PATENT NO. : 6,915,286 B2
APPLICATION NO. : 09/898266
DATED : July 5, 2005
INVENTOR(S) : Gary William Policastro et al.

It is certified that error appears in the above-identified patent and that said Letters Patent is hereby corrected as shown below:

Claim 17, col. 15, line 6: insert --sources--immediately after "further."
Claim 29, col. 15, line 67: replace "of;" with --of: --.
Claim 29, col. 16, line 3: insert -- or -- immediately after "one."
Claim 43, col. 17, line 42: replace "interface, providing" with -- interface providing--.

Signed and Sealed this

First Day of May, 2007

JON W. DUDAS
*Director of the United States Patent and Trademark Office*